US006238581B1

(12) United States Patent
Hawkins et al.

(10) Patent No.: US 6,238,581 B1
(45) Date of Patent: May 29, 2001

(54) PROCESS FOR MANUFACTURING AN ELECTRO-MECHANICAL GRATING DEVICE

(75) Inventors: Gilbert A. Hawkins, Mendon; John A. Lebens, Rush; Constantine N. Anagnostopoulos, Mendon, all of NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/216,202

(22) Filed: Dec. 18, 1998

(51) Int. Cl.[7] ........................................................ B81B 3/00
(52) U.S. Cl. ................................ 216/13; 216/38; 216/39; 264/1.1
(58) Field of Search ................................ 216/2, 13, 24, 216/38, 39, 52; 264/1.1

(56) References Cited

U.S. PATENT DOCUMENTS

| 5,542,558 | * | 8/1996 | Benz et al. ............................. 216/2 |
| 5,804,084 | * | 9/1998 | Nasby et al. ............................. 216/2 |
| 5,949,570 | * | 9/1999 | Shiono et al. ............................. 359/291 |

* cited by examiner

*Primary Examiner*—Randy Gulakowski
*Assistant Examiner*—Allan Olsen
(74) *Attorney, Agent, or Firm*—William F. Noval; Stephen H. Shaw (57) ABSTRACT

A method for manufacturing a mechanical grating device is presented. The device consists of a plurality of parallel-suspended ribbons that are deformed using, for example, an electrostatic force to actuate alternate ribbons. Actuation is a deformation of the ribbon resulting from an applied voltage to affect the height of the ribbons above a substrate. The method for manufacturing a mechanical gating device comprises the steps of:

providing a spacer layer on top of a protective layer which covers a substrate;

etching a channel entirely through the spacer layer;

depositing a sacrificial layer at least as thick as the spacer layer;

rendering the deposited sacrificial layer optically coplanar by chemical mechanical polishing;

providing a tensile ribbon layer completely covering the area of the channel;

providing a conductive layer patterned in the form of a grating;

transferring the conductive layer pattern to the ribbon layer and etching entirely through the ribbon layer; and removing entirely the sacrificial layer from the channel.

15 Claims, 7 Drawing Sheets

PROCESS FOR MANUFACTURING AN ELECTRO-MECHANICAL GRATING DEVICE

CROSS REFERENCE TO RELATED APPLICATIONS

Reference is made to U.S. Ser. No. 09/216,289 filed Dec. 18, 1998 entitled A Mechanical Grating Device, and further reference is made to U.S. Ser. No. 09/215,973 filed Dec. 18, 1998 entitled Method For Producing Coplanar Surface Structures.

FIELD OF THE INVENTION

This invention relates to the field of the fabrication of a device which modulates an incident light beam. The device is a mechanical grating device. More particularly, this invention discloses a method for manufacturing a mechanical grating device, wherein the device manufactured according to the inventive method possesses a significant improvement in the output of the diffracted light beam.

BACKGROUND OF THE INVENTION

Advances in micromachining technology have given rise to a variety of Micro-electromechanical systems (MEMS) including light modulators for low cost display applications. Such modulators provide high-resolution, high operating speeds (KHz frame rates), multiple gray scale levels, color adaptability, high contrast ratio, and compatibility with VLSI technology. One such modulator has been disclosed in U.S. Pat. No. 5,311,360, issued May 10, 1994 to Bloom et al., entitled "Method and Apparatus for Modulating a Light Beam". This modulator is a micromachined reflective phase grating. It consists of a plurality of equally spaced deformable elements in the form of beams suspended at both ends above a substrate thereby forming a grating. The deformable elements have a metallic layer that serves both as an electrode, and as reflective surface for incident light. The substrate is also reflective and contains a separate electrode. The deformable elements are designed to have a thickness equal to $\lambda/4$ where $\lambda$ is the wavelength of the incident light source. They are supported a distance of $\lambda/4$ above, and parallel to, the substrate. When the deformable elements are actuated (for example a sufficient switching voltage is applied), the deformable elements are pulled down and the incident light is diffracted. Optical systems can intercept the diffracted light. For display applications, a number of deformable elements are grouped for simultaneous activation thereby defining a pixel, and arrays of such pixels are used to form an image. Furthermore, since gratings are inherently dispersive, this modulator can be used for color displays.

Figure 1:
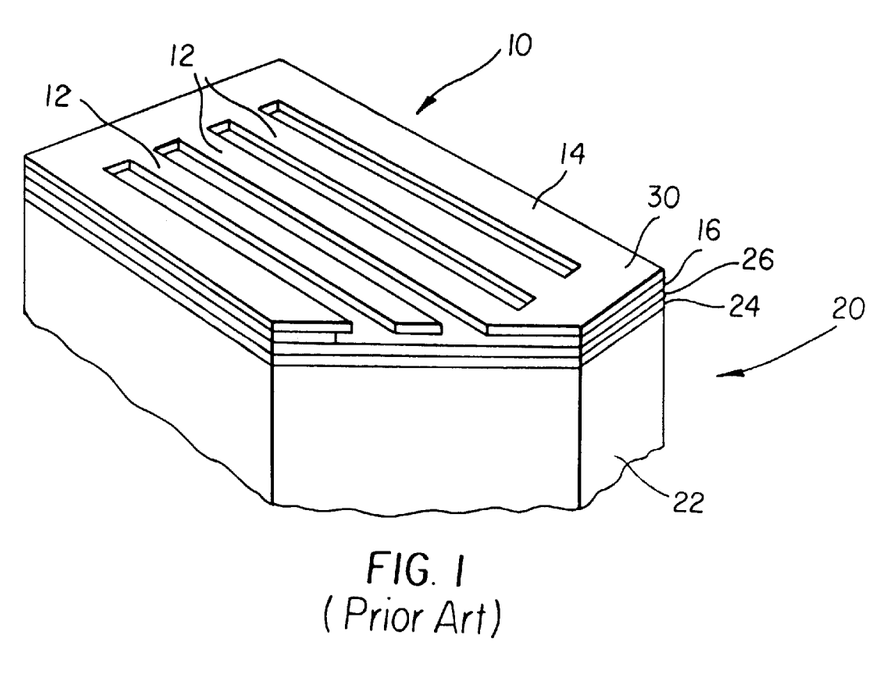
FIG. 1 is a perspective, partially cut-away view of the prior art grating device.

U.S. Pat. No. 5,677,783, issued Oct. 14, 1997 to Bloom et al., entitled "Method of Making a Deformable Grating Apparatus for Modulating a Light Beam and Including Means for Obviating Stiction Between Grating Elements and Underlying Substrate" discloses a method of making a deformable grating apparatus for modulating a light beam and including means for obviating stiction between grating elements and underlying substrate. Referring to FIG. 1, a perspective cut-away view of a prior art light modulator 10 is shown. An insulating protective layer 24 of silicon nitride topped with a buffer layer of silicon dioxide 26 is deposited on a silicon substrate 22. This is followed by the deposition of a sacrificial silicon dioxide layer 16. A silicon nitride layer 30 is next deposited in which is defined the deformable elements 12. Both the thickness of the sacrificial silicon dioxide layer 16 and the silicon nitride layer 30 are critical in determining the amplitude modulation and thus the efficiency of the grating device. In order to achieve freestanding beams the sacrificial silicon dioxide layer 16 is etched away in the active area. The remaining sacrificial silicon dioxide layer 16 not removed acts as a supporting frame 14 for the deformable elements 12. The last fabrication step provides an aluminum film (not shown) in order to enhance the reflectance of the beams and provide an electrode for application of a voltage between the deformable elements 12 and the substrate 22.

There are many problems with this prior art device. The thickness of both the sacrificial oxide layer 16 and silicon nitride layer 30 have to each be $\lambda/4$. Because these thicknesses determine the grating amplitude of the modulator, their dimensions are critical. Variations in either of these thicknesses will result in unwanted diffraction of light in the off state, as well as lower diffraction efficiency in the on state, thus lower contrast ratios. There is no freedom to adjust the thickness of the deformable element 12 for optimization of its mechanical properties.

There is no defined etch stop in the device structure during removal of the sacrificial oxide layer 16. This requires a carefully controlled time-dependent etch to ensure that the remaining sacrificial oxide layer 16 is able act as the supporting frame 14. The profile left by the wet etch openings between the beams leaves an uneven wall below the deformable elements 12 where they contact the supporting frame 14. Such effects will cause variations in the electromechanical properties of the devices.

The etching process to remove the sacrificial oxide layer is also a wet process. During this wet processing step it has been seen that stiction tends to occur in that the deformable elements tend to adhere and remain adhered to the substrate. Special drying techniques can be used to overcome this problem but complicate the process. Removal of the sacrificial layer using a dry process is preferred.

U.S. Pat. No. 5,661,592, issued Aug. 26, 1997 to Bornstein et al., entitled "Method of Making and an Apparatus for a Flat Diffraction Grating Light Valve" discloses a method for making a deformable grating apparatus which attempts to address the problems associated with this prior art device. An insulating layer is deposited on the substrate. A phosphosilicate glass (PSG) sacrificial layer is next deposited. The PSG sacrificial layer is selectively patterned removing the PSG sacrificial layer except in regions where the deformable grating elements are to be formed. The PSG is reflowed at high temperature to lower the angle of its sidewall. Silicon nitride is then deposited conformably over the PSG and patterned into deformable elements. The PSG sacrificial layer is then removed by wet etching. By selectively patterning the PSG sacrificial layer the region under the beams is more uniform relying now on the uniformity of the reflow of the PSG sacrificial layer. However the removal of the PSG sacrificial layer is still a wet process with the corresponding disadvantages as described above.

The conformal deposition of the silicon nitride over the step height formed by the patterned PSG sacrificial layer region also has topography determined by the step height. In patterning the deformable elements this topography will limit the minimum spacing between the deformable elements. Increased spacing between elements will cause increased light scattering decreasing the efficiency of the grating. The use of a PSG sacrificial layer also requires a high temperature reflow step that would complicate its integration with CMOS circuitry on the same substrate.

SUMMARY OF THE INVENTION

It is an object of the present invention to provide a method for manufacturing a mechanical grating device. The mechanical grating device has to have equal actuation conditions for the deformable elements throughout the whole device in order to improve the diffraction efficiency of the device.

The object is achieved with a method for manufacturing a mechanical grating device comprising the steps of:
providing a spacer layer on top of a protective layer which covers a substrate;
etching a channel entirely through the spacer layer;
depositing a sacrificial layer at least as thick as the spacer layer;
rendering the deposited sacrificial layer optically coplanar by chemical mechanical polishing;
providing a tensile ribbon layer completely covering the area of the channel;
providing a conductive layer patterned in the form of a grating;
transferring the conductive layer pattern to the ribbon layer and etching entirely through the ribbon layer; and
removing entirely the sacrificial layer from the channel.

Advantages

This method of fabrication produces a device with the desired performance and the specific steps of fabrication to allow manufacturing methods that are common to the microelectronics industry that are reproducible and uniform across the area of the device being produced. According to the used method the advantages of the mechanical or the electromechanical grating device produced with the inventive method are: an improved definition of the position of the channel walls beneath the deformable ribbon elements allow reproducible ribbon length. The reproducible length of the deformable ribbon elements affects resonance frequency, speed of actuation, damping affects due to resonance coupling, and air flow restriction beneath continuous areas of the ribbon layer, etc.

A further advantage is, that the actuation of the ribbon elements of the device may also be carried out for example by heat or mechanic force activation. Actuation is a deformation of the ribbon resulting from an applied force to affect the height of the ribbons above a substrate. Furthermore, the formation of a ground plane at the surface of the silicon wafer allows top side access and better charge confinement within the substrate. Additionally the device structure and materials selected are compatible with standard CMOS fabrication methods and allow a fabrication process sequence that make the fabrication of the electromechanical grating compatible with the integration of CMOS circuitry.

BRIEF DESCRIPTION OF THE DRAWINGS

The subject matter of the invention is described with reference to the embodiments shown in the drawings.

DETAILED DESCRIPTION OF THE INVENTION

Figure 2:
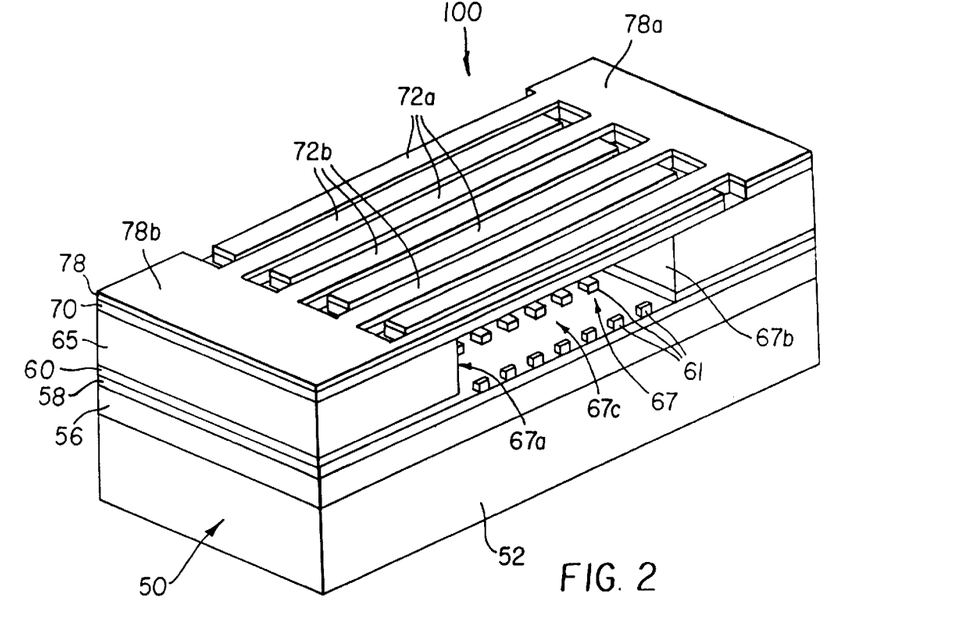
FIG. 2 is a perspective, partially cut-away view of the mechanical grating device of the present invention.

FIG. 2 is a perspective, partially cut-away view of a mechanical grating device 100 of the present invention. The mechanically deformable structures of the mechanical grating device 100 are formed on top of a base 50. The present embodiment as shown in FIG. 2 discloses a mechanical grating device 100, which can be operated by the application of an electrostatic force. According to the fact, that the actuation force of the mechanical grating device 100 is electrostatic the base 50 comprises the several layers of different materials. The base 50 comprises a substrate 52. The material of the substrate 52 is chosen from the materials glass, plastic, metal and semiconductor material. The substrate 52 is covered by a bottom conductive layer 56. In this embodiment the thin bottom conductive layer 56 is necessary since it acts as an electrode for applying the voltage to actuate the mechanical grating device 100. The thin bottom conductive layer 56 is covered by a protective layer 58. The bottom conductive layer 56 is selected from the group consisting of aluminum, titanium, gold, silver, tungsten, silicon alloys and indium tinoxide. Above the protective layer 58 a standoff layer 60 is formed which is followed by a spacer layer 65. On top of the spacer layer 65, a ribbon layer 70 is formed which is covered by a reflective layer 78. In the present embodiment the reflective layer 78 has also to be conductive in order to provide electrodes for the actuation of the mechanical grating device 100. The electrodes are patterned from the reflective and conductive layer 78.

The spacer layer 65 has a longitudinal channel 67 formed therein. The longitudinal channel 67 comprises a first and second side wall 67a and 67b and a bottom 67c. The channel 67 is open to the top and covered by a first and a second set of deformable ribbon elements 72a and 72b. Each deformable ribbon element 72a and 72b spans the channel 67 and is secured to the surface of the spacer layer 65 on either side of the channel 67. The bottom 67c of the channel 67 is covered by the protective layer 58. As mentioned above, the ribbon layer 70 is covered by the reflective layer 78. The reflective layer 78, which is conductive as well, is patterned such that there is a first and a second conducting region 78a and 78b. Both, the first and the second conductive region 78a and 78b have according to the patterning, a comb-like structure and are arranged at the surface of the mechanical grating device in an interdigitated manner. The first and second conductive region 78a and 78b are mechanically and electrically isolated from one another. According to the pattern of the reflective layer 78 the ribbon layer 70 is patterned in the same manner. As a result there are the first and the second set of deformable ribbon elements 72a and 72b spanning the channel 67 and in the direction of the channel 67 are arranged such that every other deformable ribbon element belongs to one set.

In the embodiment as shown in FIG. 2, a plurality of standoffs 61 are positioned on the bottom 67c of the channel 67. The standoffs 61 are patterned from the standoff layer 60 (detailed description of the patterning process see below) such that a group of standoffs 61 is associated only with the deformable ribbon elements 72a and 72b of the first or the second set. In the embodiment shown here, the group of standoffs 61 is associated with the second set of deformable ribbon elements 72b. The standoffs 61 may also be patterned in the form of a single bar.

Figure 3:
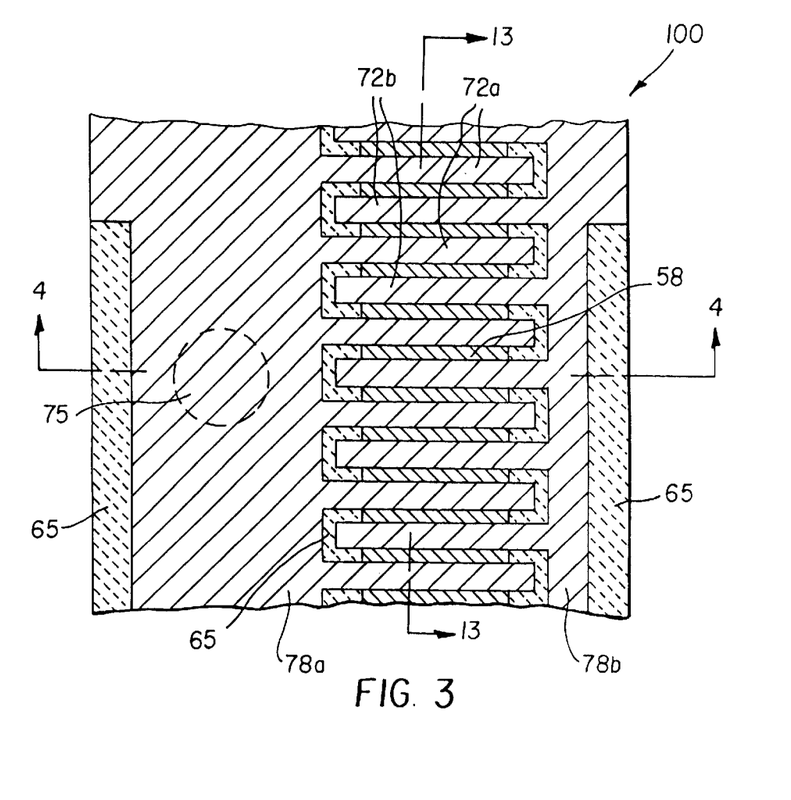
FIG. 3 is a top view of the mechanical grating device of the present invention.

Referring to FIG. 3, a top view of the mechanical grating device 100 of the present invention is shown. A first view plane A—A, perpendicular to the length of the mechanical grating device 100 provides a cross-sectional view of the mechanical grating device 100 as shown in FIGS. 4 to 12. A second view plane B—B, perpendicular to the first view plane A—A of the mechanical grating device 100 provides a cross-sectional view of the mechanical grating device 100 as shown in FIG. 13. The mechanical grating device 100, as shown is FIG. 3, is a device which can be actuated by the application of an electrostatic force. It is clear that a person skilled in the art can imagine other ways for actuating the grating device, for example thermal actuation, piezoelectric actuation or any combination. In the embodiment shown in FIG. 3, a first and a second, electrically conducting region 78a and 78b are formed on the surface of the mechanical grating device 100. The first and the second electrically conducting region 78a and 78b are electrically and mechanically isolated from each other to allow the application of voltage separately to a first and to a second set of deformable ribbon elements 72a and 72b. The first conducting region 78a applies the voltage to the first set of deformable ribbon elements 72a and the second conducting region 78b provides the voltage to the second set of deformable ribbon elements 72b. The first conducting region 78a is in contact with the bottom conductive layer 56 designated at the base 50. The connection is established by an interconnect 75 (see for example FIG. 12). The thin bottom conductive layer 56 may be formed above any layer which is below the bottom 67c of the channel 67. From the view of FIG. 3, regions of the spacer layer 65 and protective layer 58 are visible because of patterning of first and second conductive region 78a and 78b to achieve electrical and mechanical isolation of the deformable ribbon elements 72a and 72b. For operation of the mechanical grating device 100 the electrostatic force is produced by a voltage difference between the thin bottom conducting layer 56 and the first or the second conducting layer 78a or 78b which are formed atop of each deformable ribbon element 72a and 72b. According to the embodiment shown here, the voltage for actuating the ribbon elements is applied to the second set of deformable ribbon elements 72b, those elements are drawn to the bottom 67c of the channel 67. The resulting pattern is that every second deformable element (all deformable ribbon elements designated with the reference numeral 72b) are in contact with the base of the channel. It is clear that a switching of the second set of deformable elements is also possible. The same bi-level pattern can be achieved.

Figure 4:
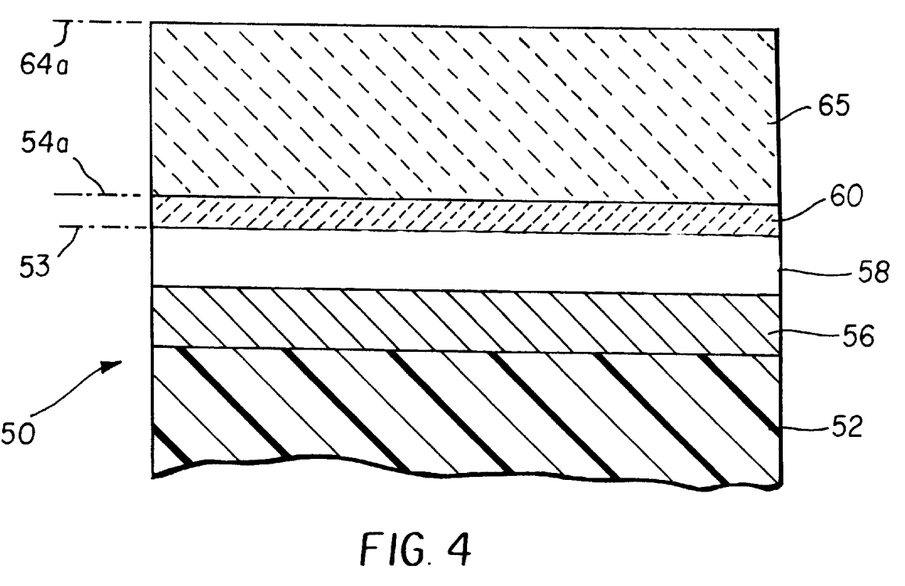
FIG. 4 is a cross-sectional view along plane A—A indicated in FIG. 3 to illustrate the layer built-up of one embodiment of the invention.

Referring now to FIG. 4, which is a cross-sectional view along plane A—A indicated in FIG. 3 to illustrate the layer built-up of one embodiment of the invention which uses standoffs 61 formed at the bottom 67c of the channel 67. The base 50 comprises the substrate 52, covered by the bottom conductive layer 56, and a protective layer 58 on top of the bottom conductive layer 56. As mentioned above the substrate 52 can be glass, plastic, metal or a semiconductor material. In the case of silicon as the substrate 52 the bottom conductive layer 56 can also be generated by an ion implantation technique. The base 50 defines a surface 53. The surface 53 of the base 50 is covered by a standoff layer 60. The standoff layer 60 defining a top surface 54a of the standoffs 61. The standoff layer 60 is then covered by the spacer layer 65. The spacer layer 65 is selected from the group consisting of silicon oxide, silicon nitride and polyimide. The top surface 54a of the standoff layer 60 will be used to define an actuation height resulting from operation. The spacer layer 65, which is for example of silicon oxide, is deposited by chemical vapor deposition. The total height of the actuation of the deformable ribbon elements 72a and 72b is defined by the thickness of the spacer layer 65 having an upper surface level 64a.

Figure 5:
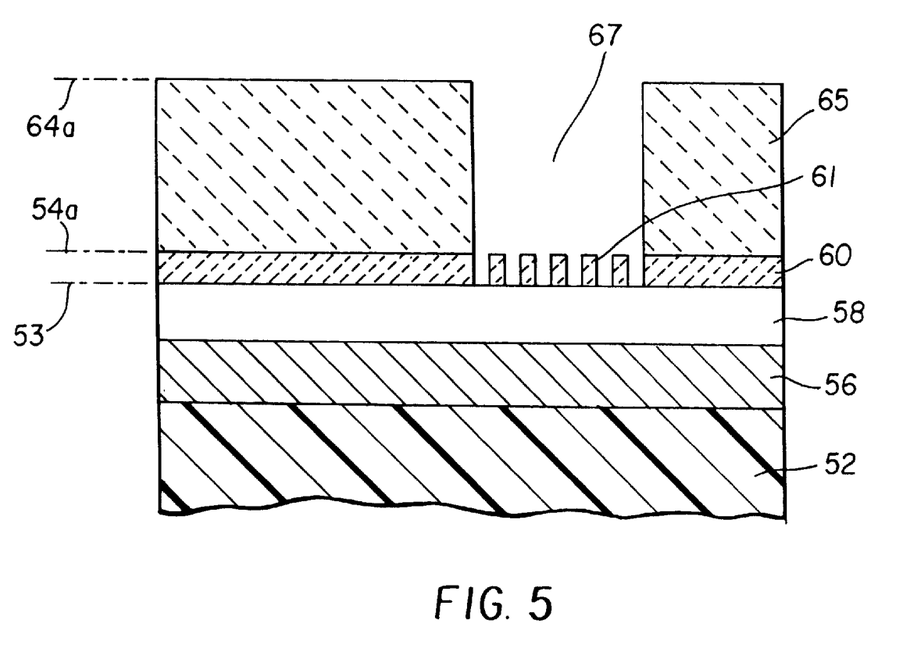
FIG. 5 is a cross-sectional view along plane A—A indicated in FIG. 3 to illustrate etching of a channel.

Referring now to FIG. 5 which is a cross-sectional view along plane A—A, indicated in FIG. 3, to illustrate etching of a channel 67. The patterning of the spacer layer 65 is carried out using standard photolithographic processing and etching methods to define the longitudinal channel 67. The active region of the mechanical grating device 100 will be located in the area of the channel 67. The standoff layer 60 is then patterned using photolithographic processing and etching methods to produce the standoffs 61, as illustrated in FIG. 5. Although not illustrated, these patterns can consist of pedestals or lines. The standoffs 61 act as mechanical stops for the actuation of the mechanical grating device and the upper surface of the standoffs 61 is defined by surface 54a. The actuated deformable ribbon elements 72a or 72b came in contact with the surface 54a of the standoffs 61.

Figure 6:
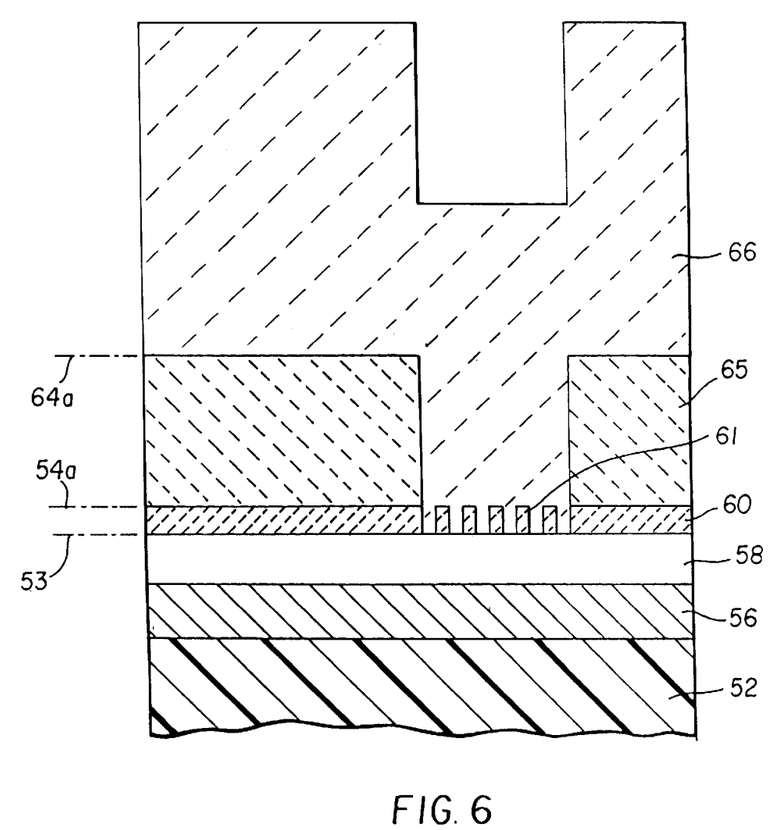
FIG. 6 is a cross-sectional view along plane A—A indicated in FIG. 3 to illustrate the deposition of a sacrificial layer.

Referring now to FIG. 6, which is a cross-sectional view along plane A—A indicated in FIG. 3 to illustrate the deposition of a sacrificial layer 66. To allow additional layers atop the existing structure, as shown in FIG. 5, a conformal sacrificial layer 66 is deposited to a thickness greater than the separation of the top surface 54a of the standoff layer 60 and the top surface 64a of the spacer layer 65 (see FIG. 6). The material for the sacrificial layer 66 is different from the spacer layer 65 and is selected from the group consisting of silicon oxide, silicon nitride, polysilicon, doped-polysilicon, silicon-germanium alloys and polyimide.

Figure 7:
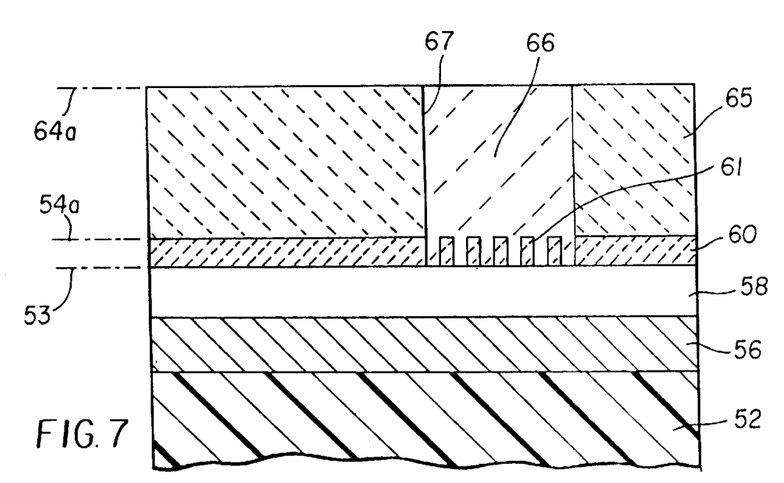
FIG. 7 is a cross-sectional view along plane A—A indicated in FIG. 3 to illustrate the removal of the sacrificial layer exceeding the channel.

Referring now to FIG. 7, which is a cross-sectional view along plane A—A indicated in FIG. 3 to illustrate the removal of the sacrificial layer 66 exceeding the channel 67. The sacrificial layer 66 is planarized to a level substantially near the top surface 64a of the spacer layer 65. Chemical mechanical polishing methods are used to achieve the polished structure. The polished surface of sacrificial layer 66 filling the channel is preferably polished to be optically coplanar with surface 64a such that a light beam reflected from the top surface of the next-to-be-deposited ribbon layer 70 would always be reflected specularly if it were scanned along ribbon layer 70 even in the region in which ribbon layer 70 contacts sacrificial layer 66 and top surface 64a of spacer layer 65. As is well known in the practice of optical engineering, this requires a surface planarity of less than about 200 Angstrom units. In this case the surface of the to-be-deposited ribbon elements 72a and 72b remain optically coplanar on both their bottom and top surfaces after removal of the material 66 providing the material of ribbon elements 72a an d72b is deposited with uniform thickness and uniform tensile stress. Also in this case, ribbon elements 72a and 72b have no mechanically irregularities at the points at which they contact spacer layer 65, thereby ensuring the ribbons pull down uniformly and predictably during device operation.

Figure 8:
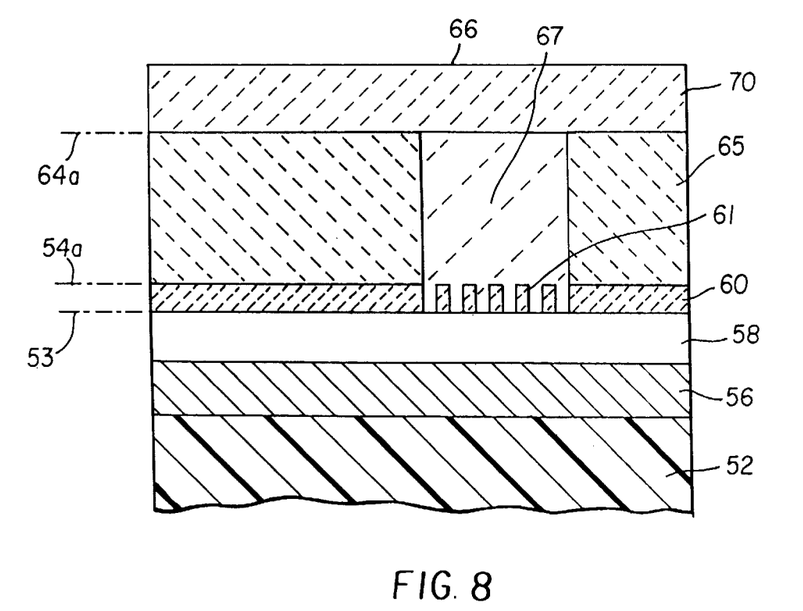
FIG. 8 is a cross-sectional view along plane A—A indicated in FIG. 3 to illustrate deposition of the ribbon layer.

Referring now to FIG. 8, which is a cross-sectional view along plane A—A indicated in FIG. 3 to illustrate deposition of the ribbon layer 70. The ribbon layer 70 is provided above the top surface 64a of the spacer layer 65, thereby also covering the area of the channel 67. Silicon nitride is a well-suited material for the ribbon layer 70 and can be patterned to provide the needed mechanical structure. Its material properties are well suited for the application because of the intrinsic tensile stress easily controlled by the deposition process.

Figure 9:
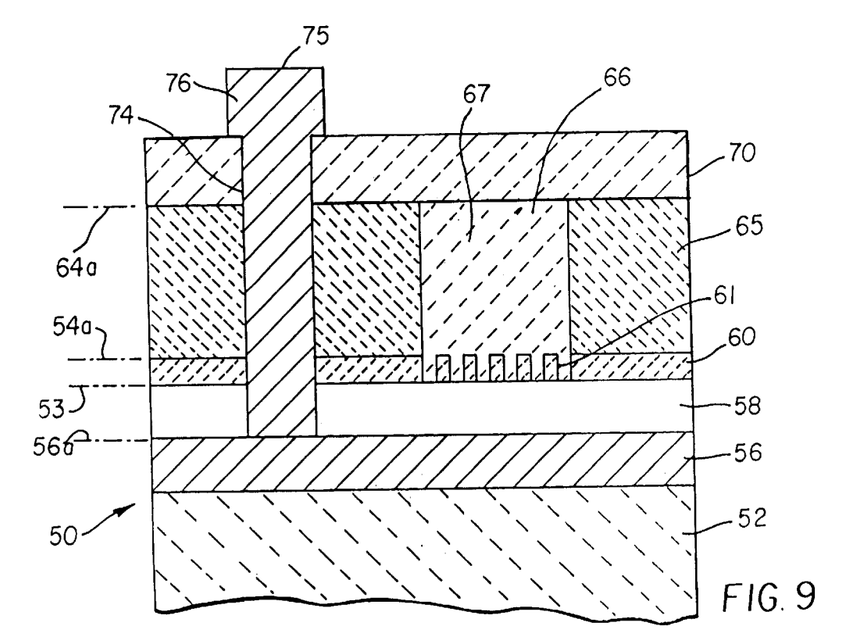
FIG. 9 is a cross-sectional view along plane A—A indicated in FIG. 3 to illustrate the provision of an interconnection between the ribbon layer and the substrate.

Referring now to FIG. 9, which is a cross-sectional view along plane A—A indicated in FIG. 3 to illustrate the provision of an interconnection 76 between the ribbon layer 70 and the bottom conductive layer 56 which is part of the structure of the base 50. Contact to the bottom conductive layer 56 is accomplished by etching at least one opening 74 using well-known etching methods. Then depositing of a thick conducting layer 76 is carried out (the thick conducting layer may be an aluminum alloy) which is followed by photolithographic processing and etching methods to limit the area coated by the thick conducting layer 76 to an area around at least one opening 74. The thick conducting layer provides an interconnect 75 between the ribbon layer and the bottom conductive layer 56.

Figure 10:
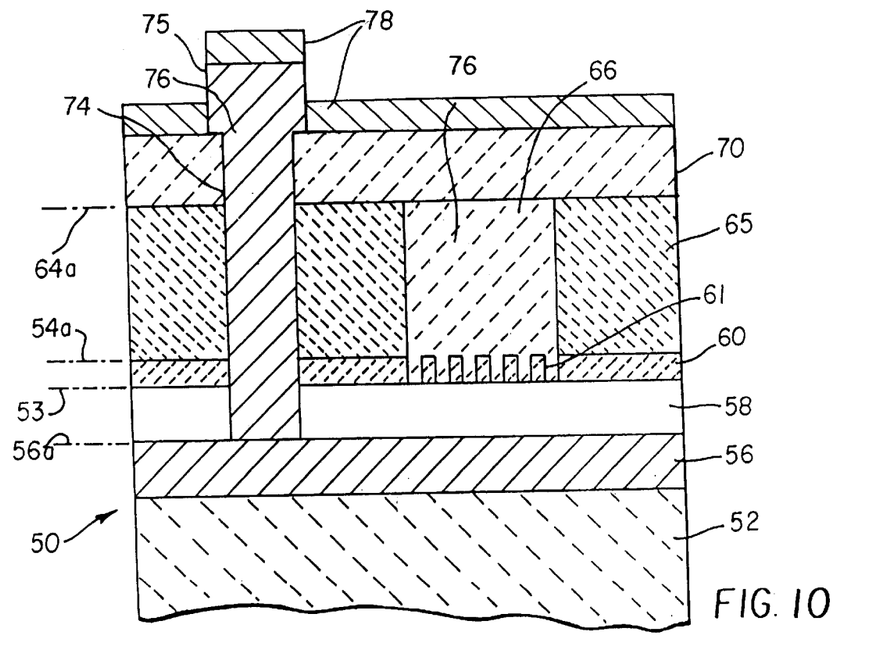
FIG. 10 is a cross-sectional view along plane A—A indicated in FIG. 3 to illustrate the provision of a reflective layer.

Referring now to FIG. 10, which is a cross-sectional view along lane A—A indicated in FIG. 3 to illustrate the provision of a reflective layer 78. According to the embodiment of an electromechanical grating device 100 the applied reflective layer 78 needs to have good electric conducting properties. The reflective layer 78 is deposited atop the ribbon layer 70. The light reflecting properties of the reflective layer 78 improve the efficiency of diffraction when operating the electromechanical grating device 100. It is important that the device has a maximized efficiency of diffraction. The material for the reflective layer 78 with conducting properties is selected from the group consisting of aluminum, titanium, gold, silver, tungsten, silicon alloys and indium tinoxide.

Figure 11:
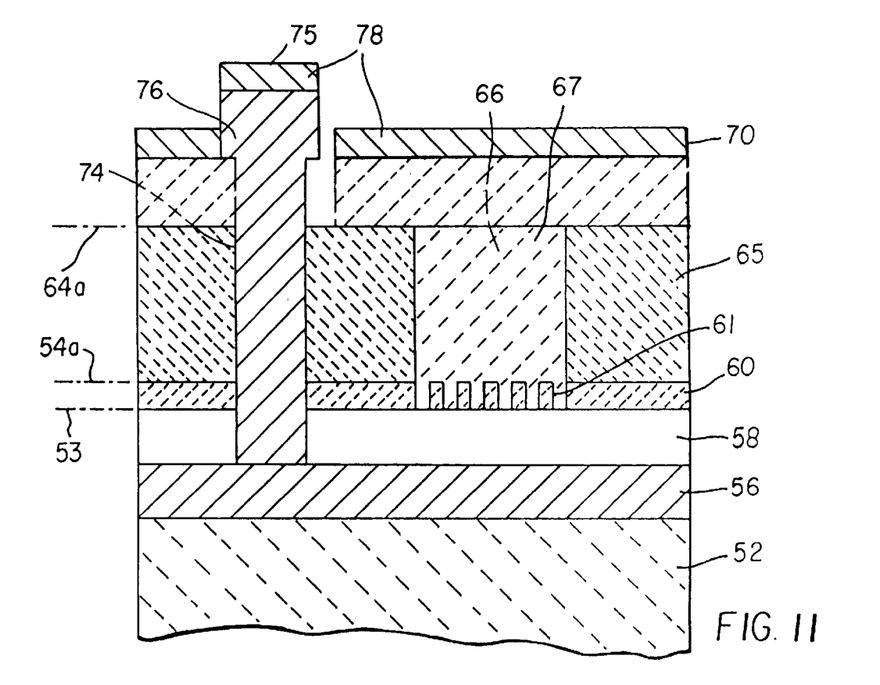
FIG. 11 is a cross-sectional view along plane A—A indicated in FIG. 3 to illustrate the patterning of the reflective layer and the ribbon layer.

Referring now to FIG. 11, which is a cross-sectional view along plane A—A indicated in FIG. 3 to illustrate the patterning of the reflective layer 78 and the ribbon layer 70. The reflective layer 78 (also conducting properties) and the ribbon layer 70 are patterned using photolithographic processing and etching. First the reflective layer 78 is patterned. Then the ribbon layer 70 is patterned using the remaining reflective layer 78 as a mask for etching. This etching process defines first and second conductive region 78a and 78b (see FIG. 2 and 3) of the reflective layer 78. The first and second conductive region 78a and 78b provide an electrical and mechanical isolation of the deformable ribbon elements 72a and 72b. The interconnect 75 connects the first conductive region 78a with the bottom conductive layer 56.

Figure 12:
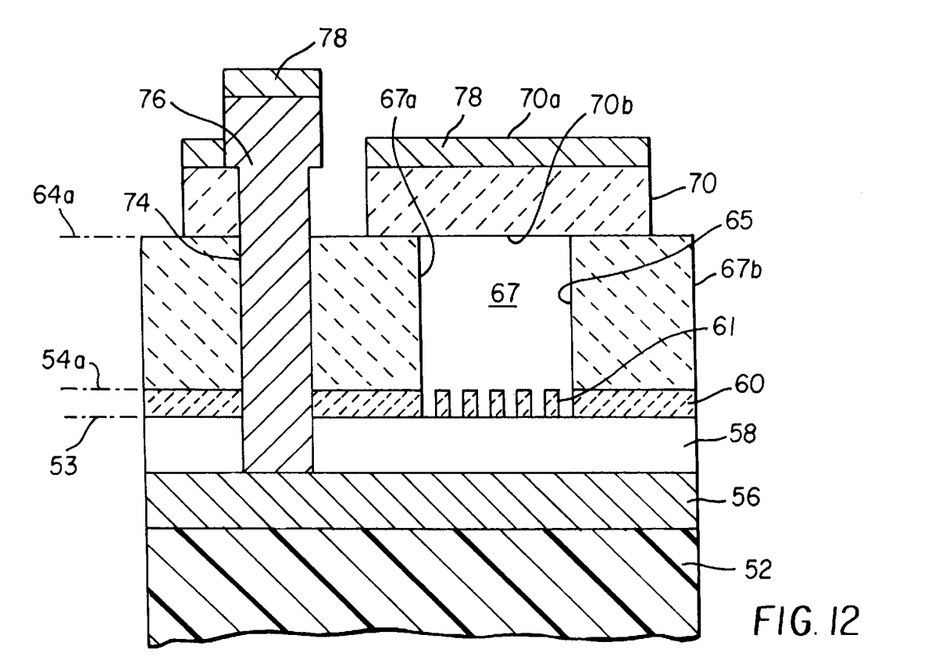
FIG. 12 is a cross-sectional view along plane A—A indicated in FIG. 3 to illustrate the removal of a sacrificial layer within the channel.
Figure 13:
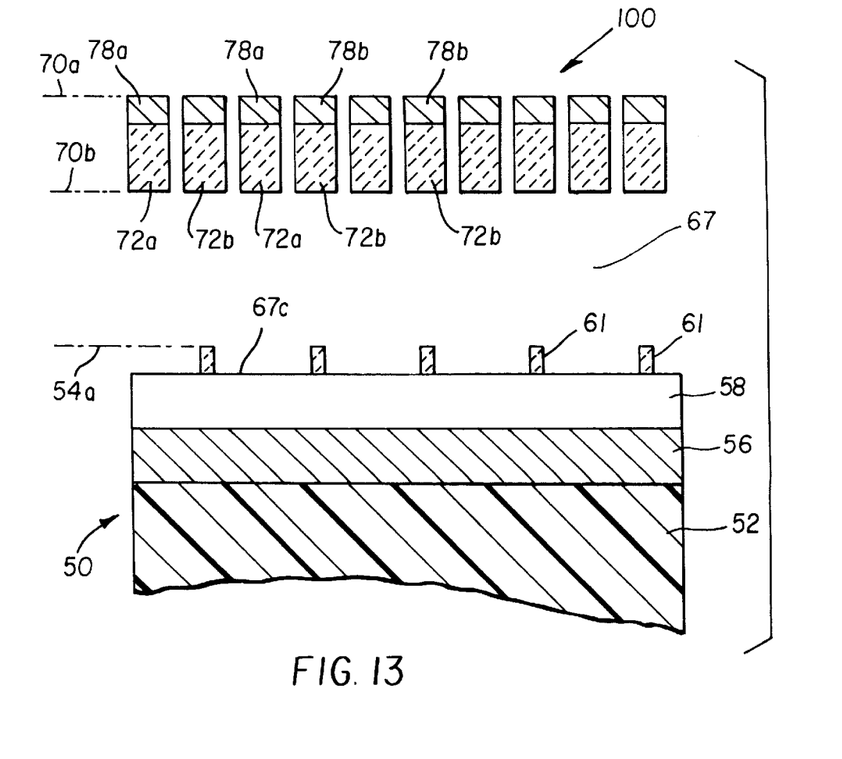
FIG. 13 is a cross-sectional view along plane B—B indicated in FIG. 3 to show one embodiment of the device fabricated according to the inventive method.

Referring now to FIG. 12, which is a cross along plane A—A indicated in FIG. 3 to illustrate the removal of a sacrificial layer 66 material within the channel 67. The sacrificial layer 66 filling the cavity 67 is removed by dry etching methods using xenon difluoride to yield the device cross-sectional view of the channel 67 as illustrated in FIG. 12. The inventive method of production of the mechanical grating device 100 results in channel 67 wherein the first and second side walls 67a and 67b define a channel 67 which has a constant cross-section in the longitudinal dimension of the mechanical grating device 100. Additionally the above described method provides a mechanical grating device 100 wherein each of the deformable ribbon elements has an exact defined top surface 70a and bottom surface 70b. In the un-actuated state, no force is applied to the deformable ribbon elements 72a and 72b, all the deformable ribbon elements 72a and 72b are coplanar with respect to their top and bottom surface 70a and 70b. Preferably, the surface of the to-be-deposited ribbon elements 72a and 72b remain optically coplanar on both their bottom and top surfaces after removal of the material 66.

FIG. 13, a cross-sectional view along plane B—B, illustrates the mechanical grating device 100 with no applied voltage to the second reflective region 78b. In case there is no voltage applied between the thin bottom conducting layer 56 and the first or the second reflective layer 78a or 78b which are formed atop of each deformable ribbon element 72a and 72b, all of the ribbon elements 72a and 72b are coplanar. In the embodiment shown in FIG. 13 the top layer on the deformable ribbon elements 72a and 72b is a reflective and conductive layer 78a and 78b which defines a top surface 70a of the coplanar ribbon elements 72a and 72b. The surface of the ribbon elements 72a and 72b facing the base 50 of the mechanical grating device 100 is designated as a bottom surface 70b. On the bottom 67c of the channel 67 a plurality of standoffs 61 are formed. Each standoff 61 defines a top surface 54a which faces the bottom surface 64a of the of the ribbon elements 72a and 72b. The depth channel 67 defines the distance between the bottom surface 70b of the ribbon elements 72a and 72b and the bottom 67c of the channel 67 or the top surface 54a of the standoffs 61. The plurality of standoffs 61 is distributed on the bottom 67c of the channel 67, such that every second deformable ribbon element 72a or 72b is associated with a standoff 61. In the embodiment shown here each of the deformable ribbon elements 72b of the second set are associated with standoffs 61.

The invention has been described in detail with particular reference to certain preferred embodiments thereof, but it will be understood that variations and modifications can be effected within the spirit and scope of the invention.

PARTS LIST 10 diffraction grating
11 incident light beam
12 deformable elements
13 diffracted beam
14 frame
13 spacer layer
20 base
22 substrate
24 passivating layer
26 conducting layer
30 thin layer
50 base
50a top surface of base
52 substrate
53 surface of the base
54a top surface of standoffs
56 bottom conductive layer
58 protective layer 60 standoff layer
61 standoff
64a upper surface level of the spacer layer
65 spacer layer
66 sacrificial layer
67 channel
67a first side wall of the channel
67b second side wall of the channel
67c bottom of the channel
70 ribbon layer
70a top surface of the coplanar ribbon elements
70b bottom surface of the coplanar ribbon elements
72a first set of deformable ribbon elements
72b second set of deformable ribbon elements
74 opening
75 interconnect
76 thick conducting
78a first conducting region
78b second conducting region
100 mechanical grating device

What is claimed is:

1. A method for manufacturing a mechanical grating device comprising the steps of:
   providing a spacer layer on top of a protective layer which covers a substrate;
   etching a channel entirely through the spacer layer;
   depositing a sacrificial layer at least as thick as the spacer layer;
   rendering the deposited sacrificial layer optically coplanar by chemical mechanical polishing;
   providing a tensile ribbon layer completely covering the area of the channel;
   providing a conductive layer patterned in the form of a grating;
   transferring the conductive layer pattern to the ribbon layer and etching entirely through the ribbon layer; and
   removing entirely the sacrificial layer from the channel.

2. The method for manufacturing a mechanical grating device according to claim 1 wherein the etching of the ribbon layer results in a first and second conductive region and in a first and a second set of deformable ribbon elements which are mechanically and electrically isolated from each other.

3. The method for manufacturing a mechanical grating device according to claim 1 comprises the step of providing a plurality of standoffs in the channel.

4. The method for manufacturing a mechanical grating device according to claim 2 comprises the steps of forming at least one electrical conductive interconnect in the spacer layer and thereby connecting one conductive region and the substrate.

5. The method for manufacturing a mechanical grating device according to claim 4 comprises the step of providing a bottom conductive layer.

6. The method for manufacturing a mechanical grating device according to claim 5 wherein the conductive layer is provided on the surface of the substrate.

7. The method for manufacturing a mechanical grating device according to claim 5 wherein the conductive layer is provided on top of the protective layer.

8. The method for manufacturing a mechanical grating device according to claim 6 wherein the step of providing a conductive bottom layer is accomplished by ion implantation.

9. The method for manufacturing a mechanical grating device according to claim 6 wherein the step of providing a conductive bottom layer is accomplished by adding a thin conductive film on the surface of the substrate.

10. The method for manufacturing a mechanical grating device according to claim 7 wherein the step of providing a conductive bottom layer is accomplished by adding a thin conductive film on the surface of the protective layer.

11. The method for manufacturing a mechanical grating device according to claim 1 wherein the material of the substrate is chosen from the materials glass, plastic, metal and semiconductor material.

12. The method for manufacturing a mechanical grating device according to claim 1 wherein the spacer layer is selected from the group consisting of silicon oxide, silicon nitride, polyimide.

13. The method for manufacturing a mechanical grating device according to claim 1 wherein the sacrificial layer is different form the spacer layer and is selected from the group consisting of silicon oxide, silicon nitride, polysilicon, doped-polysilicon, silicon-germanium alloys and polyimide.

14. The method for manufacturing a mechanical grating device according to claim 1 wherein the conductive layer is selected from the group consisting of aluminum, titanium, gold, silver, tungsten, silicon alloys and indium tinoxide.

15. The method for manufacturing a mechanical grating device according to claim 5 wherein the bottom conductive layer is selected from the group consisting of aluminum, titanium, gold, silver, tungsten, silicon alloys and indium tinoxide.

* * * * *